US008510027B2

(12) United States Patent
Tajima et al.

(10) Patent No.: US 8,510,027 B2
(45) Date of Patent: Aug. 13, 2013

(54) METHOD FOR JUDGING VEHICLE TRAVELING POSITION AND VEHICLE TRAVELING POSITION JUDGMENT DEVICE

(75) Inventors: Yasuhiro Tajima, Nisshin (JP); Kazunori Kagawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 26 days.

(21) Appl. No.: 13/262,838

(22) PCT Filed: Jun. 11, 2009

(86) PCT No.: PCT/JP2009/060698

§ 371 (c)(1), (2), (4) Date: Oct. 4, 2011

(87) PCT Pub. No.: WO2010/143291

PCT Pub. Date: Dec. 16, 2010

(65) Prior Publication Data

US 2012/0029813 A1 Feb. 2, 2012

(51) Int. Cl.
*G05D 1/02* (2006.01)

(52) U.S. Cl.
USPC ............ 701/300; 701/408; 340/435; 340/903

(58) Field of Classification Search
USPC ................. 701/300, 301, 408; 340/436, 903, 340/435
See application file for complete search history.

(56) References Cited

U.S. PATENT DOCUMENTS 6,311,123 B1 * 10/2001 Nakamura et al. .............. 701/96
6,363,311 B1 * 3/2002 Kuroda et al. .................. 701/96
6,526,352 B1 * 2/2003 Breed et al. ................... 701/470
6,567,737 B2 * 5/2003 Nakamura et al. .............. 701/96
6,684,149 B2 * 1/2004 Nakamura et al. .............. 701/96
6,691,018 B1 * 2/2004 Miyahara ........................ 701/96
6,768,944 B2 * 7/2004 Breed et al. .................... 701/301
6,879,706 B2 * 4/2005 Satoh et al. .................... 382/104
7,085,637 B2 * 8/2006 Breed et al. ..................... 701/38
7,202,776 B2 * 4/2007 Breed ........................... 340/435

(Continued)

FOREIGN PATENT DOCUMENTS

JP 2003-121542 4/2003
JP 2003 337029 11/2003

(Continued)

OTHER PUBLICATIONS

Wu et al, Vision-Based Driving Environment Identification for Autonomous Highway Vehicles, 2004 IEEE International Conference on Networking, Sensing and Control, 2004, pp. 1323-1328.*

(Continued)

*Primary Examiner* — Russell Frejd
(74) *Attorney, Agent, or Firm* — Oblon, Spivak, McClelland, Maier & Neustadt, L.L.P.

(57) ABSTRACT

A vehicle traveling position judging method of the present invention is a vehicle traveling position judging method for judging the traveling position of a preceding vehicle, and includes: a relative position information acquisition step of acquiring the relative position information of the preceding vehicle and a host vehicle at a predetermined point in time; a host vehicle traveling trajectory information acquisition step of acquiring traveling trajectory information of the host vehicle after the predetermined point in time; and a preceding vehicle position judging step of judging a traveling position of the preceding vehicle on the basis of the relative position information and the traveling trajectory information of the host vehicle.

6 Claims, 13 Drawing Sheets

(56) References Cited

U.S. PATENT DOCUMENTS

| | | | | |
|---|---|---|---|---|
| 7,224,290 | B2 * | 5/2007 | Takenaga et al. | 340/907 |
| 7,734,419 | B2 * | 6/2010 | Kondoh | 701/301 |
| 7,782,179 | B2 * | 8/2010 | Machii et al. | 340/435 |
| 7,920,969 | B2 * | 4/2011 | Mudalige et al. | 701/301 |
| 2002/0080019 | A1 * | 6/2002 | Satoh et al. | 340/436 |
| 2006/0173611 | A1 | 8/2006 | Takagi et al. | |
| 2007/0276577 | A1 * | 11/2007 | Kuge et al. | 701/96 |

FOREIGN PATENT DOCUMENTS

| | | |
|---|---|---|
| JP | 2004 050923 | 2/2004 |
| JP | 2004 249891 | 9/2004 |
| JP | 2006 209535 | 8/2006 |
| JP | 2007 280060 | 10/2007 |
| WO | 2005 020183 | 3/2005 |

OTHER PUBLICATIONS

Shimomura et al, An Algorithm for Distinguishing the Types of Objects on the Road Using Laser Radar and Vision, IEEE Transactions on Intelligent Transportation Systems, vol. 3, No. 3, Sep. 2002, pp. 189-195.*

International Search Report issued Jul. 7, 2009 in PCT/JP09/060698 filed Jun. 11, 2009.

English translation of the International Preliminary Report on Patentability and Written Opinion of the International Searching Authority issued Dec. 15, 2011, in PCT/JP2009/060698.

* cited by examiner

METHOD FOR JUDGING VEHICLE TRAVELING POSITION AND VEHICLE TRAVELING POSITION JUDGMENT DEVICE

TECHNICAL FIELD

The present invention relates to a vehicle traveling position judging method and a vehicle traveling position judgment device for judging the traveling position of a preceding vehicle.

BACKGROUND ART

Conventionally, as a technique in this field, a position detecting device disclosed in Japanese Unexamined Patent Application Publication No. 2003-337029 is known. In this device, the relative position relationship between a host vehicle and another vehicle is calculated on the basis of host vehicle position information by a GPS, which is created by the host vehicle, and the other vehicle position information by a GPS received from another vehicle. In addition, it is possible to know the traveling position of another vehicle by matching and specifying the host vehicle position and the other vehicle position on the read map while maintaining this positional relationship.

CITATION LIST

Patent Literature

Patent Literature 1: Japanese Unexamined Patent Application Publication No. 2003-337029

SUMMARY OF INVENTION

Technical Problem

It is thought that this device can know along which road another vehicle is traveling. In various recent kinds of drive assisting systems, however, not only specifying the road along which another vehicle travels is requested, but also the information which even specifies in which lane of the road another vehicle is traveling is requested in many cases. In the position detecting device described above, however, it was difficult to specify the lane in which another vehicle travels due to the problem of GPS accuracy. In addition, although the map information is used in the position detecting device described above, roads for which detailed lane information is present on the map are only some of the main roads, and it is not possible to specify the position up to the lane on the other road. Moreover, as another method, it may be considered to judge the lane of another preceding vehicle by millimeter wave radar or a camera image obtained by imaging a preceding vehicle. However, when there is another vehicle cutting in between a host vehicle and a preceding vehicle or when another vehicle whose position is to be judged is not directly seen due to environmental factors, such as a sharp curve, it cannot be applied.

Therefore, it is an object of the present invention to provide a vehicle traveling position judging method and a vehicle traveling position judgment device capable of accurately judging the lane in which a preceding vehicle travels.

Solution to Problem

A vehicle traveling position judging method of the present invention is a vehicle traveling position judging method for judging the traveling position of a preceding vehicle, and is characterized in that it includes: a relative position information acquisition step of acquiring the relative position information of the preceding vehicle and a host vehicle at a predetermined point in time; a host vehicle traveling trajectory information acquisition step of acquiring traveling trajectory information of the host vehicle after the predetermined point in time; and a preceding vehicle position judging step of judging a traveling position of the preceding vehicle on the basis of the relative position information and the traveling trajectory information of the host vehicle.

According to this vehicle traveling position judging method, it is possible to acquire the relative position information of the preceding vehicle and a host vehicle at a predetermined point in time, to acquire the traveling trajectory information of the host vehicle after the predetermined point in time, and to judge the traveling position of the preceding vehicle with high precision on the basis of the relative position information and the traveling trajectory information of the host vehicle. Accordingly, even the lane in which the preceding vehicle travels can be judged.

Moreover, in the relative position information acquisition step, the relative position information may be calculated on the basis of a difference between the coordinate information of the preceding vehicle acquired by a GPS and the coordinate information of the host vehicle acquired by a GPS.

According to this configuration, since the coordinate information of the host vehicle and other vehicles is acquired by simple means called a GPS (Global Positioning System), the relative position information can be calculated.

Moreover, the vehicle traveling position judging method of the present invention may further include a lane change information acquisition step of acquiring lane change information regarding lane changes of the preceding vehicle after the predetermined point in time. In the preceding vehicle position judging step, the traveling position of the preceding vehicle may be judged on the basis of the additional lane change information.

According to this configuration, it is possible to judge with high precision in which lane another vehicle is located by combining the relative position information of the host vehicle and another vehicle at the predetermined point in time, the traveling trajectory information of the host vehicle after the predetermined point in time, and the information regarding lane changes of the preceding vehicle after the predetermined point in time.

Moreover, the vehicle traveling position judging method of the present invention may further include: a preceding vehicle traveling trajectory information acquisition step of acquiring traveling trajectory information of the preceding vehicle after the predetermined point in time; and a lane shape acquisition step of acquiring a lane shape of a lane, in which the preceding vehicle travels, on the basis of the traveling trajectory information of the preceding vehicle and the lane change information. In the preceding vehicle position judging step, the traveling position of the preceding vehicle may be judged on the basis of the additional lane shape.

According to this configuration, since the lane shape is acquired on the basis of the traveling trajectory information of the preceding vehicle after the predetermined point in time and the lane change information of the preceding vehicle, the traveling position of the preceding vehicle can be judged with high precision by taking the lane shape into consideration further.

Moreover, a vehicle traveling position judging method of the present invention is a vehicle traveling position judging method for judging the traveling position of a preceding vehicle, and is characterized in that it includes: a relative position information acquisition step of calculating relative position information of the preceding vehicle and a host vehicle at a predetermined point in time on the basis of coordinate information of the preceding vehicle acquired by a GPS and coordinate information of the host vehicle acquired by a GPS; a host vehicle traveling trajectory information acquisition step of acquiring traveling trajectory information of the host vehicle after the predetermined point in time; and a preceding vehicle position judging step of judging a traveling position of the preceding vehicle on the basis of the relative position information and the traveling trajectory information of the host vehicle.

In this vehicle traveling position judging method, the relative position information of the host vehicle and the preceding vehicle at the predetermined point in time is acquired using a GPS, and the traveling trajectory information of the host vehicle after the predetermined point in time is further acquired. In addition, since the traveling position of the preceding vehicle can be judged with high precision on the basis of the relative position and the traveling trajectory information of the host vehicle, even the lane in which the preceding vehicle travels can be judged.

In addition, a vehicle traveling position judgment device of the present invention is a vehicle traveling position judgment device for judging a traveling position of a preceding vehicle, and is characterized in that it includes: relative position information acquisition means for acquiring relative position information of the preceding vehicle and the host vehicle at a predetermined point in time; host vehicle traveling trajectory information acquisition means for acquiring traveling trajectory information of the host vehicle after the predetermined point in time; and preceding vehicle position judging means for judging a traveling position of the preceding vehicle on the basis of the relative position information and the traveling trajectory information of the host vehicle.

According to this vehicle traveling position judgment device, it is possible to acquire the relative position information of the preceding vehicle and a host vehicle at a predetermined point in time, to acquire the traveling trajectory information of the host vehicle after the predetermined point in time, and to judge the traveling position of the preceding vehicle with high precision on the basis of the relative position information and the traveling trajectory information of the host vehicle. Accordingly, even the lane in which the preceding vehicle travels can be judged.

Moreover, the relative position information acquisition means may calculate the relative position information on the basis of a difference between coordinate information of the preceding vehicle acquired by a GPS and coordinate information of the host vehicle acquired by a GPS.

According to this configuration, since the coordinate information of the host vehicle and other vehicles is acquired by simple means called a GPS, the relative position information can be calculated.

Moreover, the vehicle traveling position judgment device of the present invention may further include lane change information acquisition means for acquiring lane change information regarding lane changes of the preceding vehicle after the predetermined point in time. The preceding vehicle position judging means may judge the traveling position of the preceding vehicle on the basis of the additional lane change information.

According to this configuration, it is possible to judge with high precision in which lane another vehicle is located by combining the relative position information of the host vehicle and another vehicle at the predetermined point in time, the traveling trajectory information of the host vehicle after the predetermined point in time, and the information regarding lane changes of the preceding vehicle after the predetermined point in time.

Moreover, the vehicle traveling position judgment device of the present invention may further include: preceding vehicle traveling trajectory information acquisition means for acquiring traveling trajectory information of the preceding vehicle after the predetermined point in time; and lane shape acquisition means for acquiring a lane shape of a lane, in which the preceding vehicle travels, on the basis of the traveling trajectory information of the preceding vehicle and the lane change information. The preceding vehicle position judging means may judge the traveling position of the preceding vehicle on the basis of the additional lane shape.

According to this configuration, since the lane shape is acquired on the basis of the traveling trajectory information of the preceding vehicle after the predetermined point in time and the lane change information of the preceding vehicle, the traveling position of the preceding vehicle can be judged with high precision by taking the lane shape into consideration further.

In addition, a vehicle traveling position judgment device of the present invention is a vehicle traveling position judgment device for judging the traveling position of a preceding vehicle, and is characterized in that it includes: relative position information acquisition means for calculating relative position information of the preceding vehicle and a host vehicle at a predetermined point in time on the basis of coordinate information of the preceding vehicle acquired by a GPS and coordinate information of the host vehicle acquired by a GPS; host vehicle traveling trajectory information acquisition means for acquiring traveling trajectory information of the host vehicle after the predetermined point in time; and preceding vehicle position judging means for judging a traveling position of the preceding vehicle on the basis of the relative position information and the traveling trajectory information of the host vehicle.

In this vehicle traveling position judgment device, the relative position information of the host vehicle and the preceding vehicle at the predetermined point in time is acquired using a GPS, and the traveling trajectory information of the host vehicle after the predetermined point in time is further acquired. In addition, since the traveling position of the preceding vehicle can be judged with high precision on the basis of the relative position and the traveling trajectory information of the host vehicle, even the lane in which the preceding vehicle travels can be judged.

Advantageous Effects of Invention

According to the vehicle traveling position judging method and the vehicle traveling position judgment device of the present invention, it is possible to accurately judge the lane in which a preceding vehicle travels.

DESCRIPTION OF EMBODIMENTS

Hereinafter, preferred embodiments of a vehicle traveling position judging method and a vehicle traveling position judgment device related to the present invention will be described in detail with reference to the drawings.

First Embodiment

Figure 1:
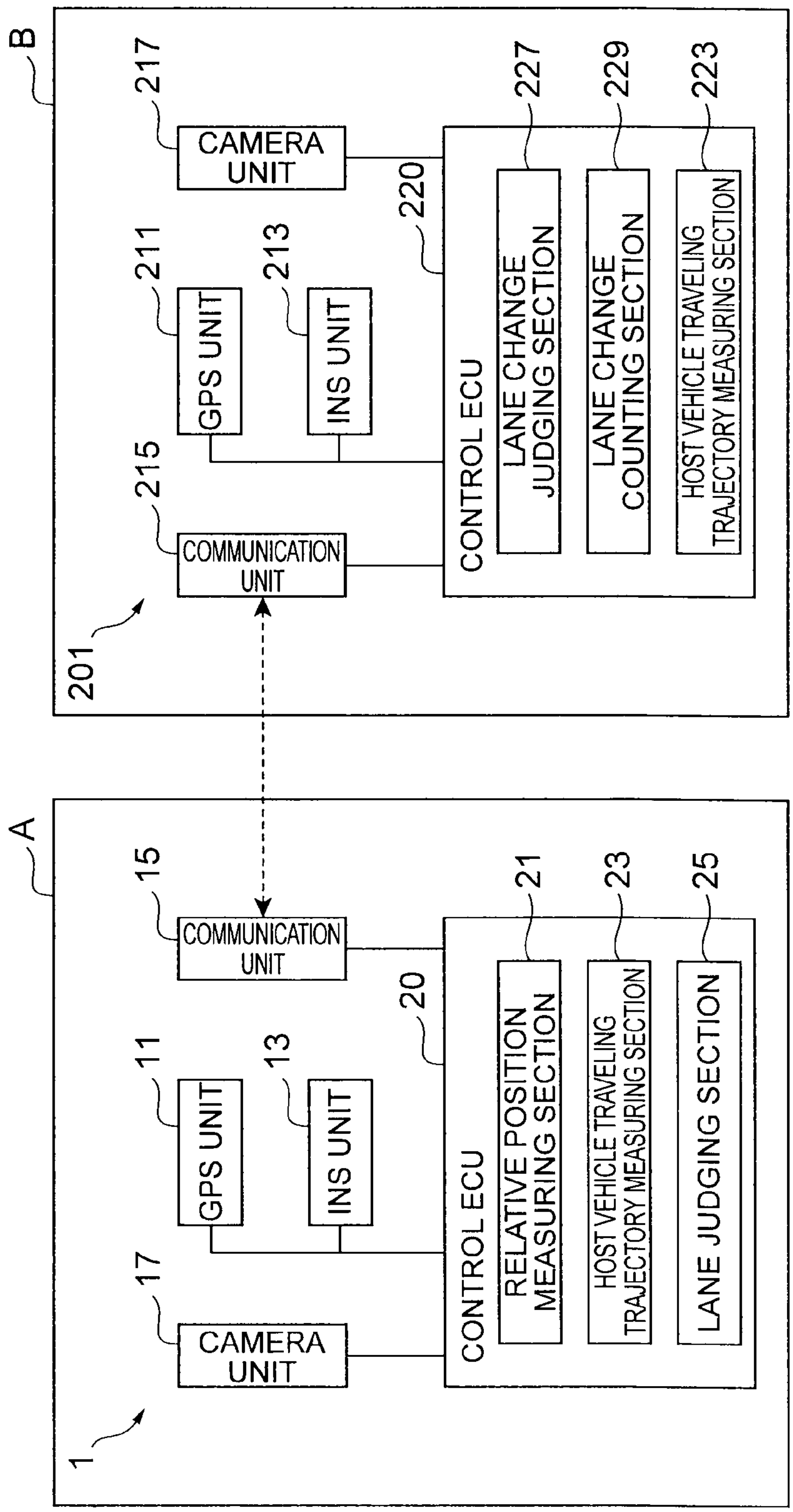
FIG. 1 is a block diagram showing an embodiment of a vehicle traveling position judgment device of the present invention.
Figure 2:
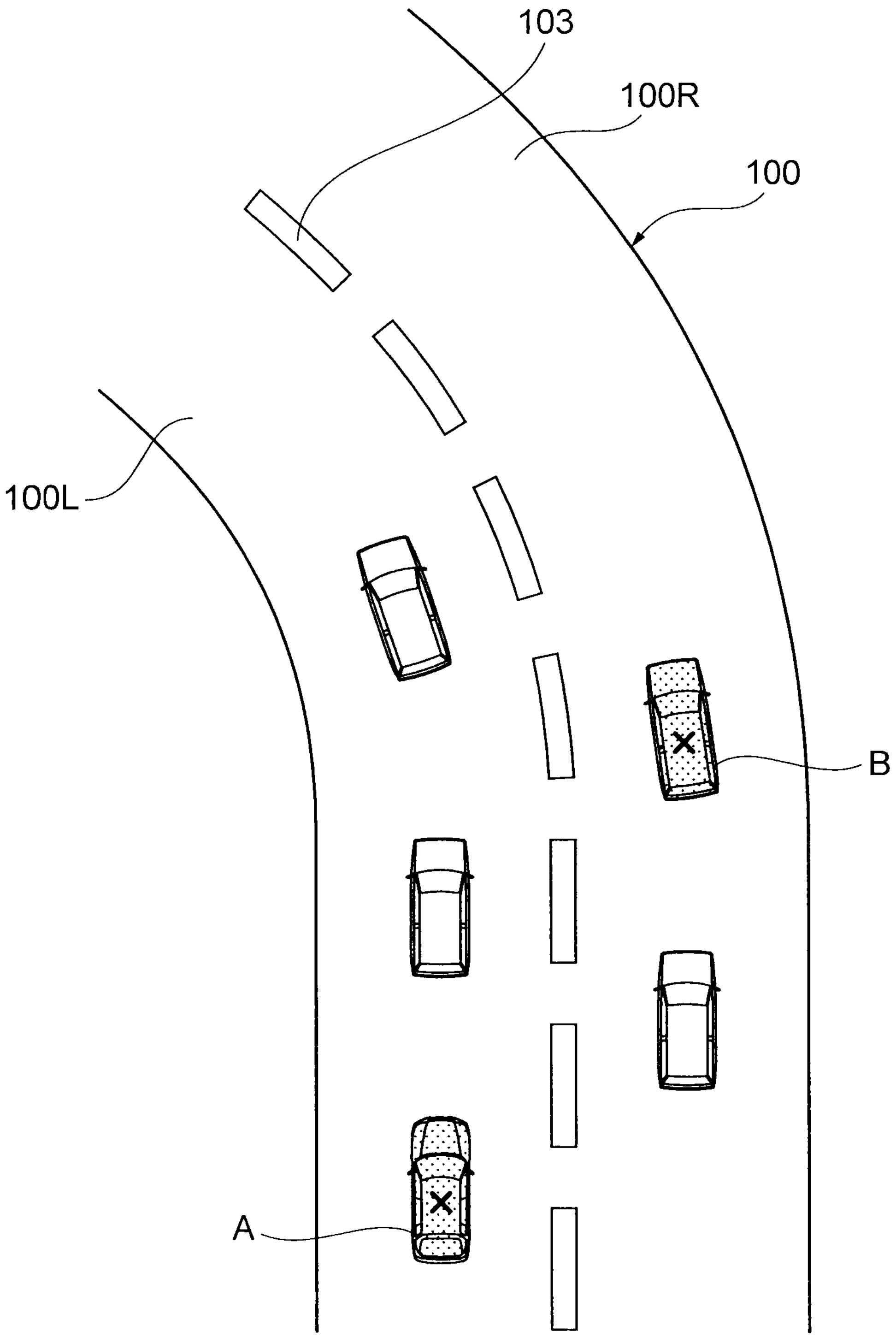
FIG. 2 is a plan view showing a host vehicle and a preceding vehicle which travel along the road having two lanes.

As shown in FIG. 1, a vehicle traveling position judgment device 1 is a device mounted in a vehicle A and is also a device which judges in which lane of the road a preceding vehicle B, which travels along the same road 100 as a host vehicle A as shown in FIG. 2, is traveling. When the preceding vehicle B is directly seen from the host vehicle A, it is also possible to judge the lane in which the preceding vehicle B travels using a camera or a radar device. However, the vehicle traveling position judgment device 1 can judge the lane in which the preceding vehicle B travels even when the preceding vehicle B is not directly seen. In the following explanation, the case where a road 100 includes two lanes of a left lane 100L and a right lane 100R will be described as an example.

As shown in FIG. 1, the vehicle traveling position judgment device 1 includes a GPS unit 11, an INS unit 13, a communication unit 15, a camera unit 17, and a control ECU (Electronic Control Unit) 20.

The GPS (Global Positioning System) unit 11 receives a GPS data signal from a GPS satellite. The control ECU 20 can acquire the coordinate information of the host vehicle or the traveling trajectory of the host vehicle on the basis of the received GPS data signal. The INS (Inertial Navigation System) unit 13 can acquire the traveling trajectory of the host vehicle by inertial navigation based on the measurement information of a yaw sensor or a G sensor, separately from the GPS unit 11. Also when it is not possible to acquire the host vehicle traveling trajectory by the GPS unit 11, the host vehicle traveling trajectory can be acquired by the INS unit 13.

The communication unit 15 performs vehicle-to-vehicle communication with a communication unit 215 of the preceding vehicle B. By this vehicle-to-vehicle communication, it is possible to share the information regarding the host vehicle position or the host vehicle traveling trajectory between the host vehicle and another vehicle. That is, the vehicle A can transmit to the vehicle B the information regarding the host vehicle position or the host vehicle traveling trajectory acquired by the GPS unit 11, or the vehicle A can receive the information regarding the position of the vehicle B and the traveling trajectory acquired by a GPS unit 211 of the vehicle B. In addition, by this vehicle-to-vehicle communication, it is possible to share the travel state (for example, a vehicle speed, acceleration, and the like) or other information between the host vehicle and another vehicle.

The camera unit 17 acquires an image of the front of the host vehicle and/or the rear of the host vehicle. For example, when the preceding vehicle B is included in an image, the control ECU 20 can acquire the traveling trajectory of the preceding vehicle B on the basis of the image. In addition, it is possible to detect lane change of the host vehicle by detecting the centerline of the road from the image of the camera unit 17.

The control ECU 20 of the vehicle A is an electronic control unit that performs overall control of the entire vehicle traveling position judgment device 1 and is configured to include as a main component a computer including a CPU, a ROM, and a RAM, for example. The control ECU 20 performs various kinds of information processing on the basis of signals acquired by the GPS unit 11, the INS unit 13, the communication unit 15, and the camera unit 17.

Similar to the vehicle A described above, a vehicle traveling position judgment device 201 mounted in the vehicle B includes the GPS unit 211, an INS unit 213, a communication unit 215, a camera unit 217, and a control ECU 220. Since the configuration of each of the GPS unit 211, the INS unit 213, the communication unit 215, the camera unit 217, and control ECU 220 is the same as that of each of the GPS unit 11, the INS unit 13, the communication unit 15, the camera unit 17, and the control ECU 20, repeated explanation thereof will be omitted.

The control ECU 20 of the vehicle A includes a relative position measuring section 21, a host vehicle traveling trajectory measuring section 23, and a lane judging section 25. Each component of the relative position measuring section 21, the host vehicle traveling trajectory measuring section 23, and the lane judging section 25 is a constituent component realized by software when hardware components such as a CPU, a RAM, and a ROM of the control ECU 20 collaborate with each other according to a predetermined program to operate.

The relative position measuring section 21 calculates the relative position of the vehicles A and B on the basis of a difference between the position coordinates $P_a$ of the host vehicle A obtained by the GPS unit 11 and the position coordinates $P_b$ of the vehicle B, which are measured by the GPS unit 211 of the vehicle B and are transmitted by vehicle-to-vehicle communication, by a so-called "vehicle-to-vehicle code differential positioning method". According to this vehicle-to-vehicle code differential positioning method, the influence of the ionosphere and the troposphere on GPS satellite signals can be canceled. Therefore, the relative position between the vehicles A and B can be acquired with high precision.

The host vehicle traveling trajectory measuring section 23 acquires the host vehicle position coordinates continuously by the GPS unit 11 and calculates the traveling trajectory of the host vehicle by integration of the GPS speed. In addition, for a section where it is not possible to acquire the host vehicle position coordinates by the GPS unit 11, the traveling trajectory can be complemented by the information from the INS unit 13. The lane judging section 25 judges eventually whether the preceding vehicle B is traveling in the same lane as the host vehicle A or traveling in a different lane.

On the other hand, the control ECU 220 of the vehicle traveling position judgment device 201 of the vehicle B includes a lane change judging section 227, a lane change counting section 229, and a host vehicle traveling trajectory measuring section 223. Each component of the lane change judging section 227, the lane change counting section 229, and the host vehicle traveling trajectory measuring section 223 is a constituent component realized by software when hardware components such as a CPU, a RAM, and a ROM of the control ECU 220 collaborate with each other according to a predetermined program to operate. The lane change judging section 227 detects a centerline 103 (FIG. 2) of the road 100 from the image of the front of the host vehicle and/or the rear of the host vehicle acquired by the camera unit 217 and detects the lane change of the vehicle B by recognizing that the vehicle B has crossed the centerline 103. The lane change counting section 229 counts the number of times of regarding lane changes detected by the lane change judging section 227. In addition, the host vehicle traveling trajectory measuring section 223 has the same configuration as the host vehicle traveling trajectory measuring section 23 of the vehicle A.

Figure 3:
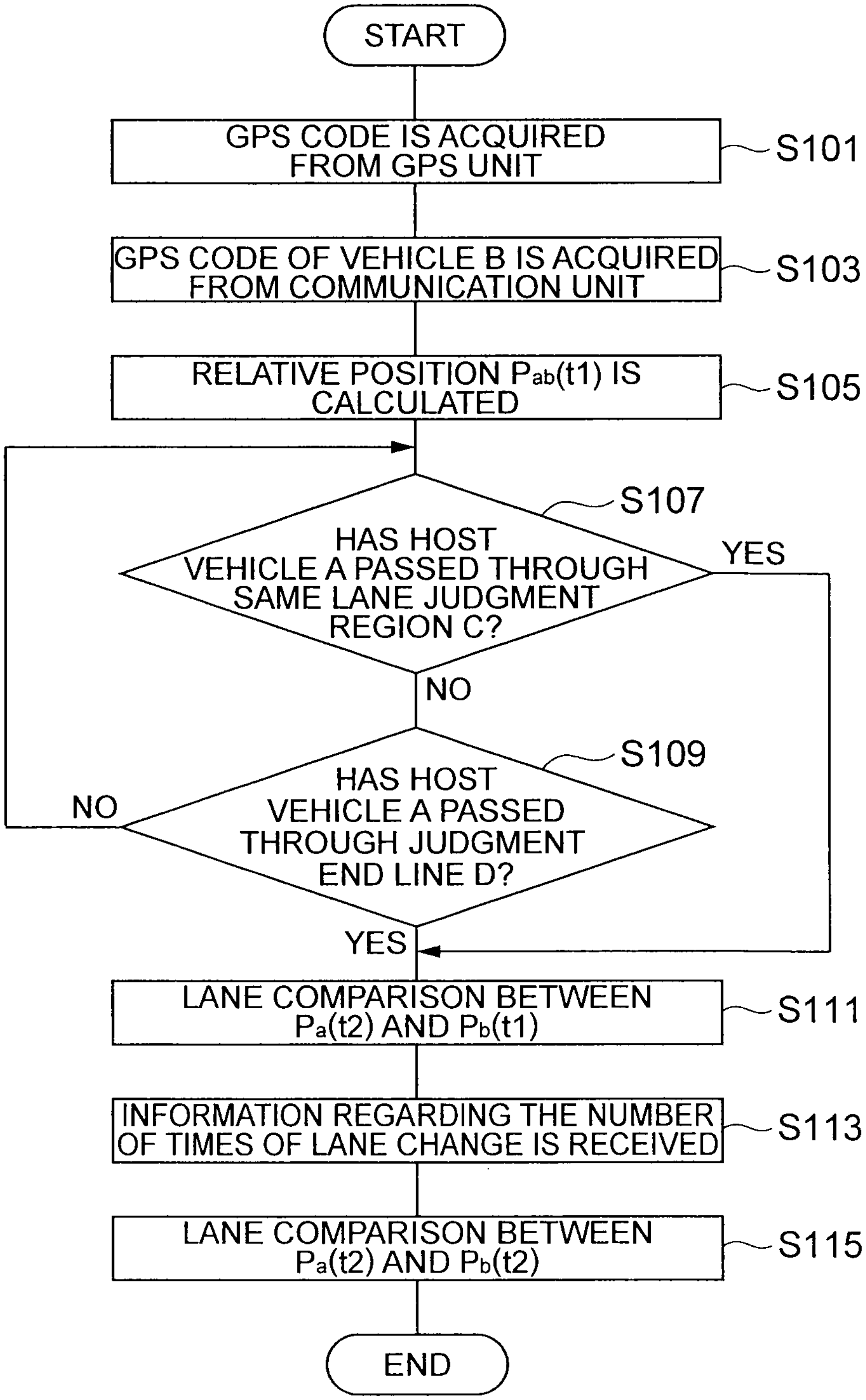
FIG. 3 is a flow chart showing an embodiment of a vehicle traveling position judging method of the present invention.

Subsequently, processing in which the vehicle A judges the lane, in which the preceding vehicle B travels, on the basis of the configuration of each of the vehicles A and B, will be described with reference to the flow chart in FIG. 3. In the following explanation, it is assumed that the position of the preceding vehicle A at a certain time t is "$P_a$(t)" and the position of the preceding vehicle B at a certain time t is "$P_b$(t)". In addition, the relative position of the vehicle B to the vehicle A at a certain time t is expressed as "$P_{ab}$(t)". Moreover, in the following description, each time is expressed as subscripted t like "time t1", "time t2", . . . , and it is assumed that the larger the number of the subscript, the further ahead the time in the future.

Figure 4:
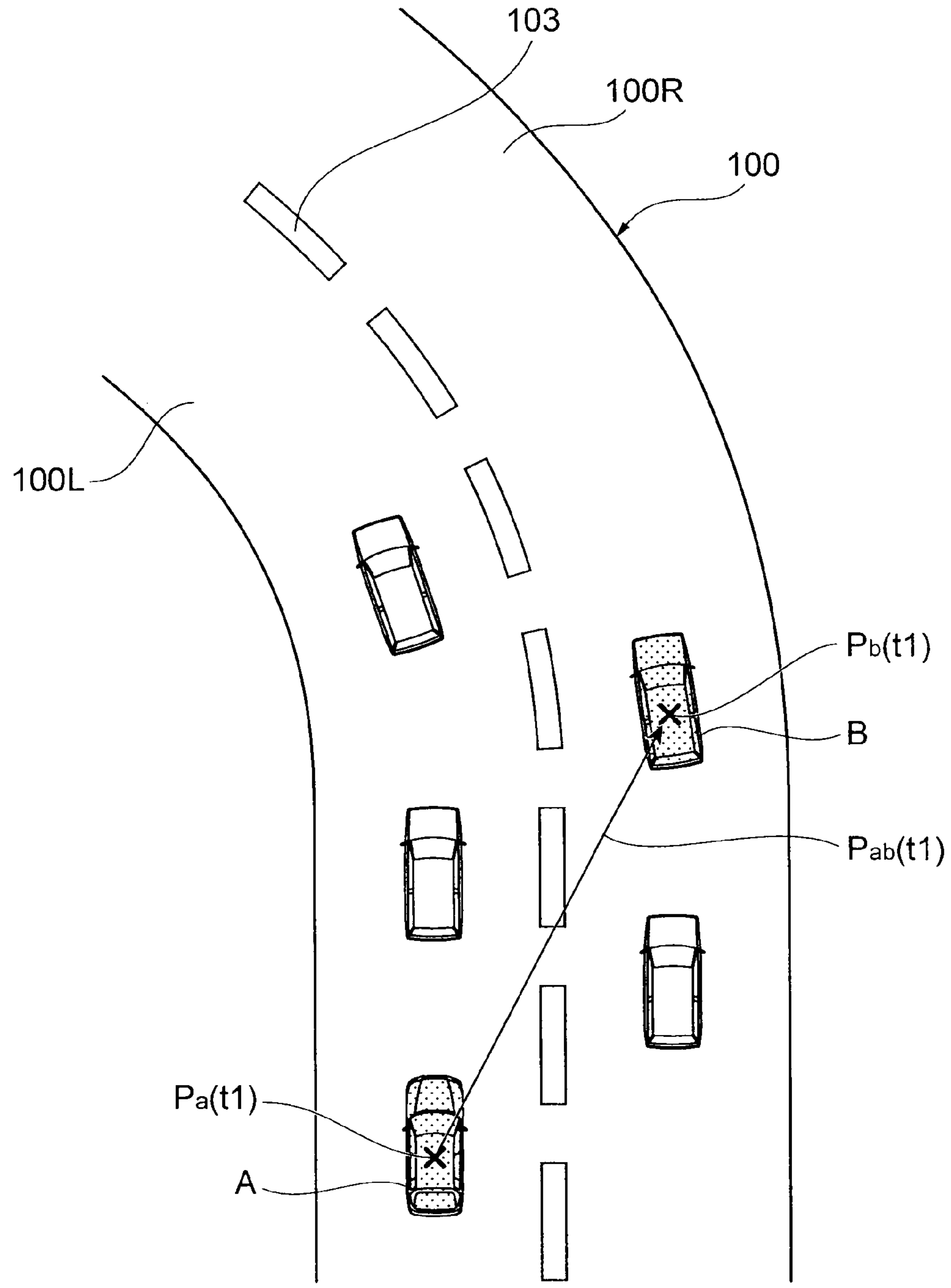
FIG. 4 is a plan view showing the positional relationship between a host vehicle and a preceding vehicle at time t1.

At a certain time t1, the positional relationship between the vehicles A and B traveling along the road 100 is assumed to be shown in FIG. 4. As shown in FIG. 3, at this time t1, the relative position measuring section 21 of the vehicle A acquires a GPS code indicating the coordinates of the position $P_a$(t1) of the host vehicle A from the GPS unit 11 (S101). At this time, the vehicle B acquires a GPS code indicating the coordinates of the position $P_b$(t1) of the host vehicle B and transmits the GPS code to the vehicle A through the communication unit 215. The relative position measuring section 21 of the vehicle A acquires the GPS code of the vehicle B through the communication unit (S103). In addition, although GPS codes indicating the three-dimensional coordinates of the vehicles A and B can be acquired herein, it is assumed that only the information of plane coordinates (for example, east-west coordinates and north-south coordinates) is used and coordinates in a vertical direction are not used in the following processing.

Figure 5:
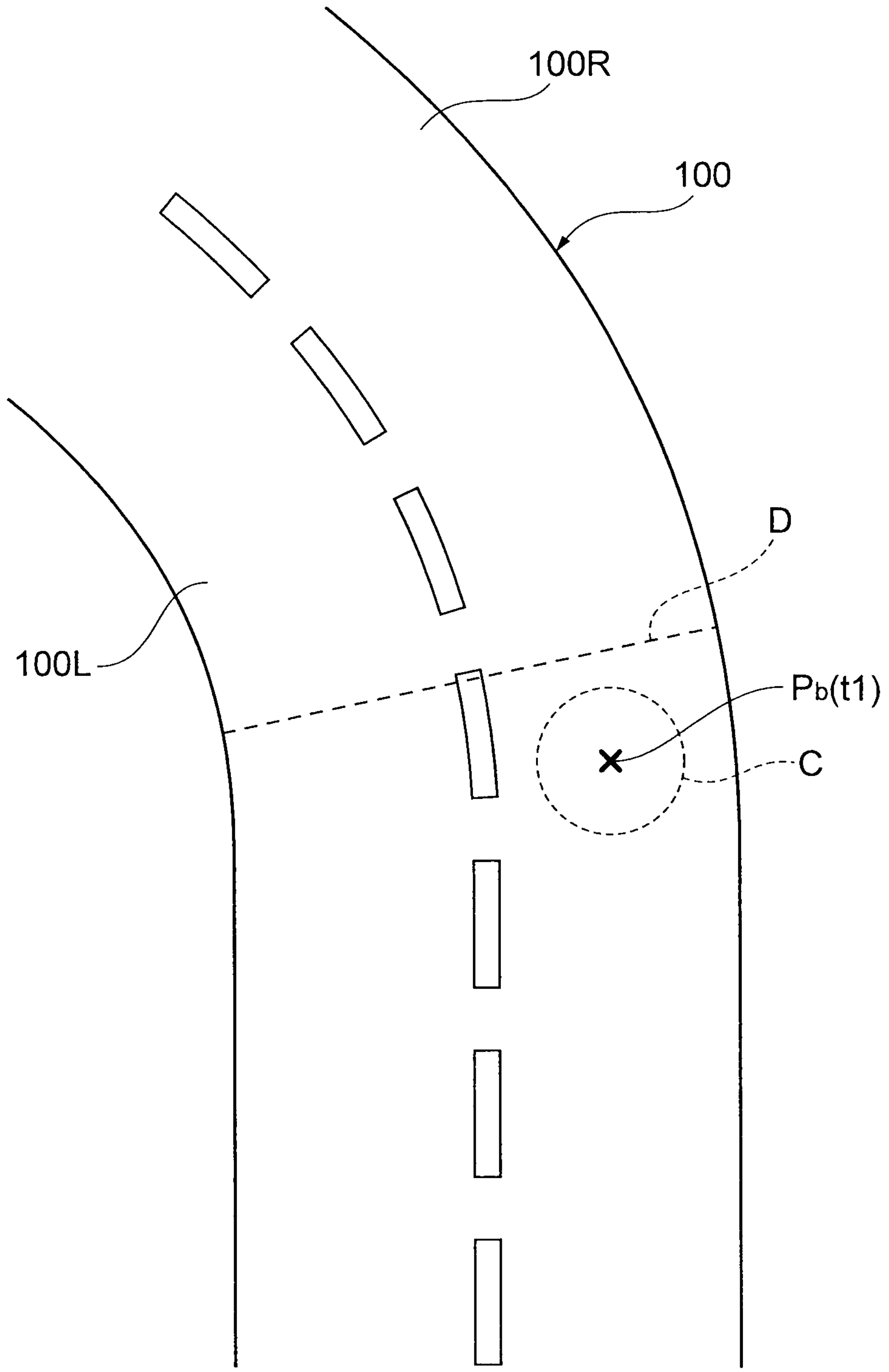
FIG. 5 is a plan view showing the same lane judgment region and the judgment end line.

Then, the relative position measuring section 21 calculates a difference between the GPS code of the vehicle A and the GPS code of the vehicle B and calculates a relative position $P_{ab}$(t1) of the vehicles A and B by the vehicle-to-vehicle code differential positioning method (S105). At this time, as shown in FIG. 5, the relative position measuring section 21 sets virtually a same lane judgment region C having a radius r with the position $P_b$(t1) as its center. In addition, a judgment end line D crossing the road 100 is virtually set at the position immediately before the position $P_b$(t1) in the traveling direction. The radius r is set to 1 m, for example.

After time t1, the host vehicle traveling trajectory measuring section 23 of the vehicle A acquires the traveling trajectory of the host vehicle A continuously until the host vehicle A passes through the same lane judgment region C (S107) or the host vehicle A passes through the judgment end line D (S109). Then, when the traveling trajectory of the host vehicle A passes either the same lane judgment region C or the judgment end line D, lane comparison processing for determining whether or not the position $P_a$(t2) and the position $P_b$(t1) are in the same lane is performed at time t2 at this time (S111).

Figure 6:
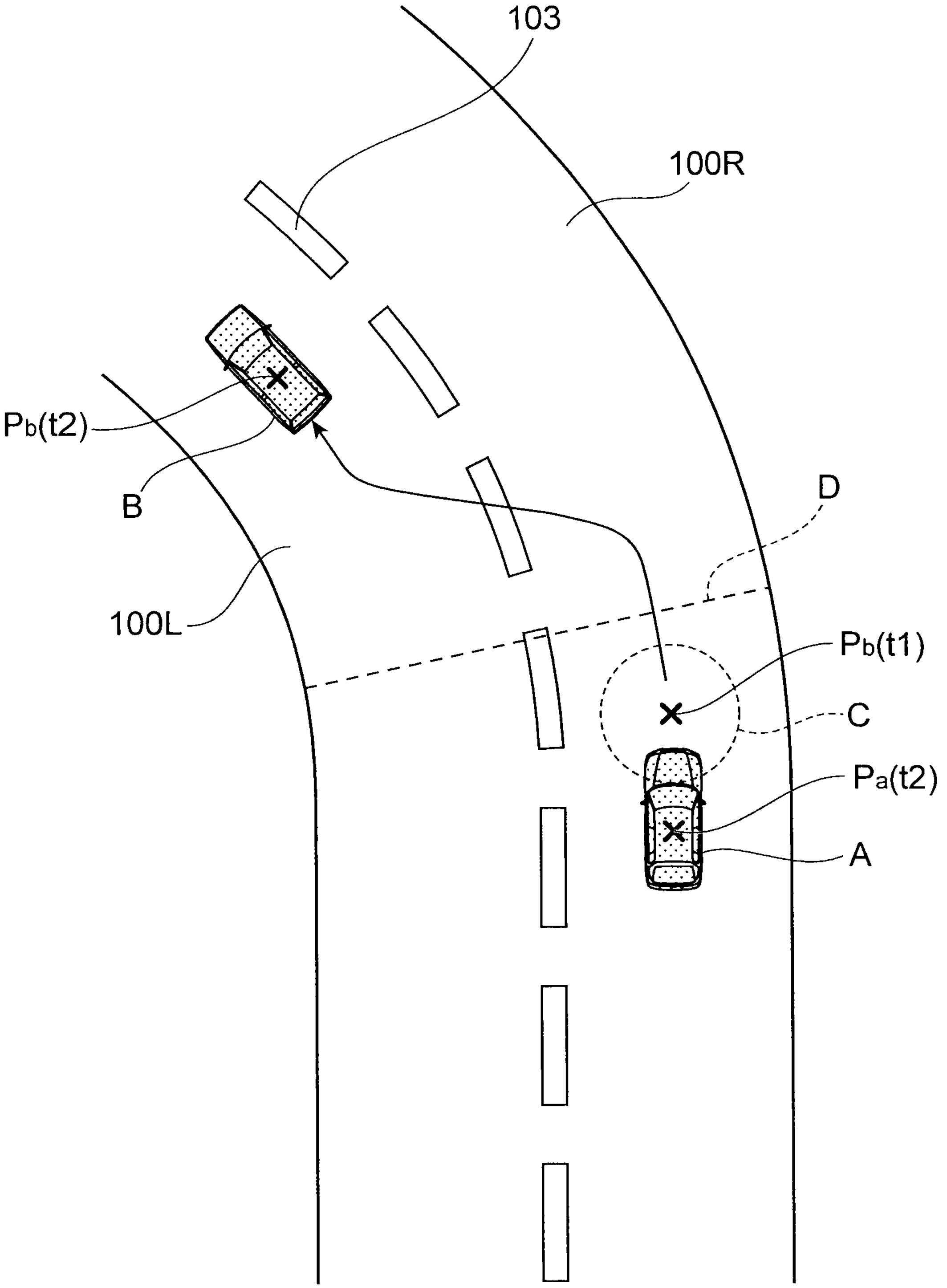
FIG. 6 is a plan view showing the positional relationship between a host vehicle and a preceding vehicle at time t2.

That is, as shown in FIG. 6, when the host vehicle A has passed through the same lane judgment region C at time t2 (Yes in S107), it is thought that the position $P_a$(t2) of the vehicle A at time t2 is in the same lane as the position $P_b$(t1). In this case, therefore, in S111, the host vehicle traveling trajectory measuring section 23 recognizes that the lane in which the host vehicle A travels at the present time t2 is the same lane as the lane in which the vehicle B was present at the past time t1.

Figure 7:
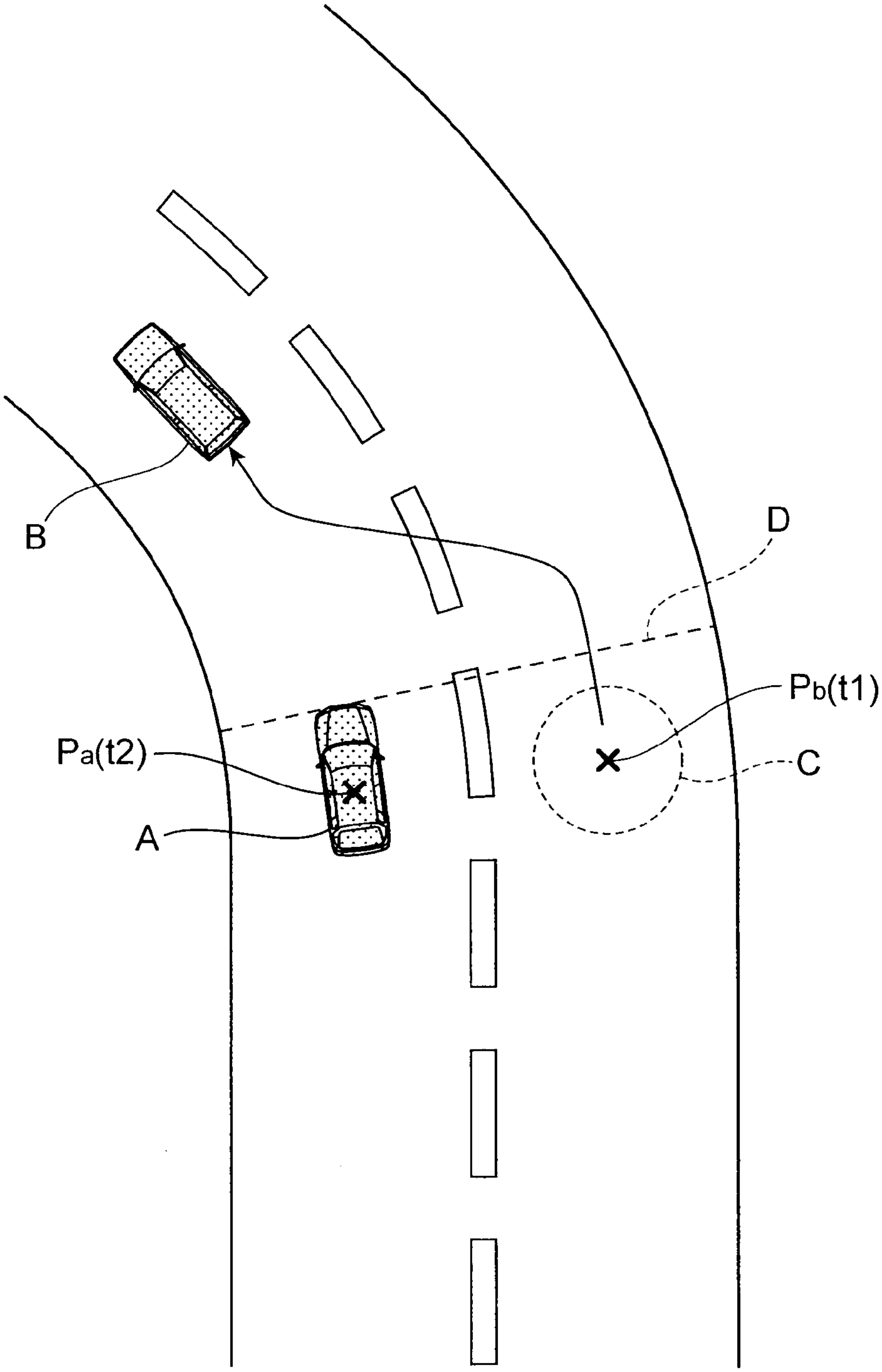
FIG. 7 is a plan view showing another positional relationship between a host vehicle and a preceding vehicle at time t2.

On the other hand, as shown in FIG. 7, when the host vehicle A has passed through the judgment end line D without passing through the same lane judgment region C at time t2 (Yes in S109), it is thought that the position $P_a$(t2) of the vehicle A at time t2 is in a different lane from the position $P_b$(t1). In this case, therefore, in S111, the host vehicle traveling trajectory measuring section 23 recognizes that the lane in which the host vehicle A travels at the present time t2 is a different lane from the lane in which the vehicle B was present at the past time t1.

Separately from the above processing by the vehicle A, the lane change judging section 227 of the vehicle B counts the number of times of regarding lane changes of the host vehicle B from time t1 to time t2. For example, in cases of the examples of FIGS. 6 and 7, the vehicle B performs one lane change from time t1 to time t2. At time t2, the vehicle A receives the information regarding the number of times of regarding lane changes from the vehicle B through vehicle-to-vehicle communication (S113).

Then, the lane judging section 25 judges whether or not the position $P_a$(t2) and the position $P_b$(t2) are in the same lane on the basis of the information regarding the lane comparison in S111 and the information indicating whether the number of times of lane change in S113 is an even number or an odd number (S115). That is, for example, in the case of the example shown in FIG. 6, it is clear that the position $P_a$(t2) and the position $P_b$(t2) are in different lanes since the position $P_a$(t2) and the position $P_b$(t1) are in the same lane and the number of times of lane change of the vehicle B is an odd number (1 time in this case). Accordingly, the lane judging section 25 can judge that the preceding vehicle B is traveling in a different lane from the host vehicle A at the present time t2. Similarly, for example, in the case of the example shown in FIG. 7, it is clear that the position $P_a$(t2) and the position $P_b$(t2) are in the same lane since the position $P_a$(t2) and the position $P_b$(t1) are in different lanes and the number of times of lane change of the vehicle B is an odd number (1 time in this case). Accordingly, the lane judging section 25 can judge that the preceding vehicle B is traveling in the same lane as the host vehicle A at the present time t2.

According to the vehicle traveling position judgment device 1 and the vehicle traveling position judging method described above, the relative position $P_{ab}$(t1) can be acquired at time t1 with high precision compared with the width of a lane since the vehicle-to-vehicle code differential positioning method is used. Since the information regarding the number of times of lane change which can be accurately counted is combined with the relative position $P_{ab}$(t1) to perform lane comparison between the position $P_a$(t2) and the position $P_b$(t2), it is possible to correctly judge whether or not the preceding vehicle B is traveling in the same lane as the host vehicle A. In addition, according to the vehicle traveling position judgment device 1 and the vehicle traveling position judging method, the judgment is also possible when there is another vehicle cutting in between the host vehicle A and the preceding vehicle B or when the preceding vehicle B is not directly seen from the host vehicle A due to environmental factors, such as a sharp curve.

In addition, the vehicle B can judge whether or not the rear vehicle A is traveling in the same lane as the host vehicle B by transmitting to the vehicle B the information regarding lane comparison between the position $P_a$(t2) and the position $P_b$(t2) judged by the vehicle A in S115. That is, the vehicle traveling position judgment devices 1 and 201 can also be used as devices when the vehicle B judges a lane in which the rear vehicle A travels.

Moreover, according to this configuration, after time t2, the vehicle A can recognize in which lane 100R or 100L the vehicle B is traveling by acquiring only the number of times of lane change of the vehicle B from time t2. In order to do so, from time t2, the lane change detection information may be transmitted from the vehicle B to the vehicle A whenever the lane change judging section 227 of the vehicle B detects a lane change. Moreover, similarly, the vehicle B can recognize in which lane 100R or 100L the vehicle A is traveling by acquiring only the number of times of lane change of the vehicle A from time t2. Therefore, from time t2, the vehicles A and B can judge the lane in which the vehicle of the other party travels with a small amount of communication such as the exchange of only the information regarding the number of times of lane change.

Second Embodiment

In a vehicle traveling position judgment device and a vehicle traveling position judging method of the present embodiment, judgment processing is further performed after the above-described processing S115, so that the judgment result in S115 can be rechecked. Hereinafter, processing performed after the processing S115 will be described with reference to FIGS. 8 to 12.

Figure 8:
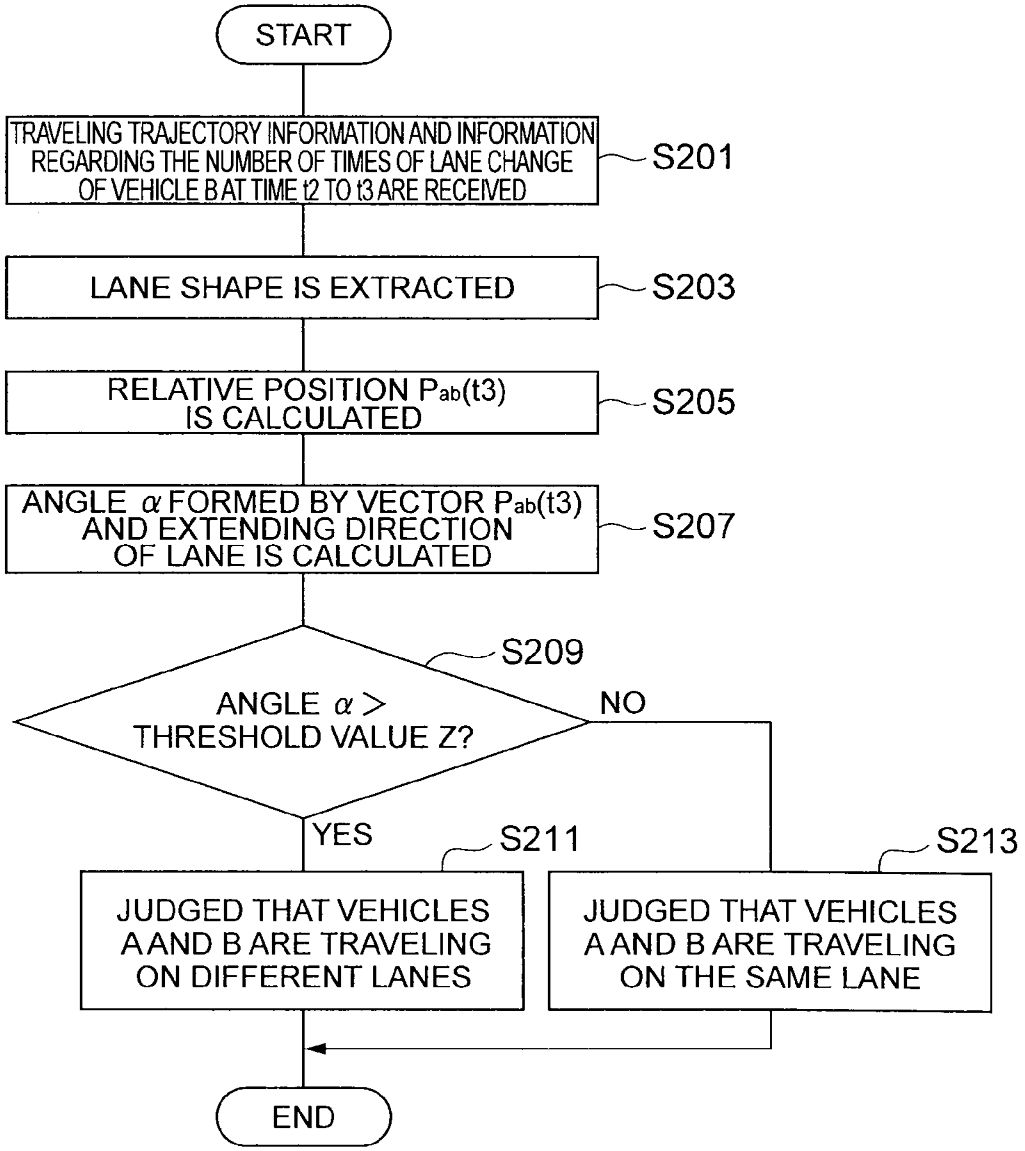
FIG. 8 is a flow chart showing processing which is further performed after processing of FIG. 3.
Figure 9:
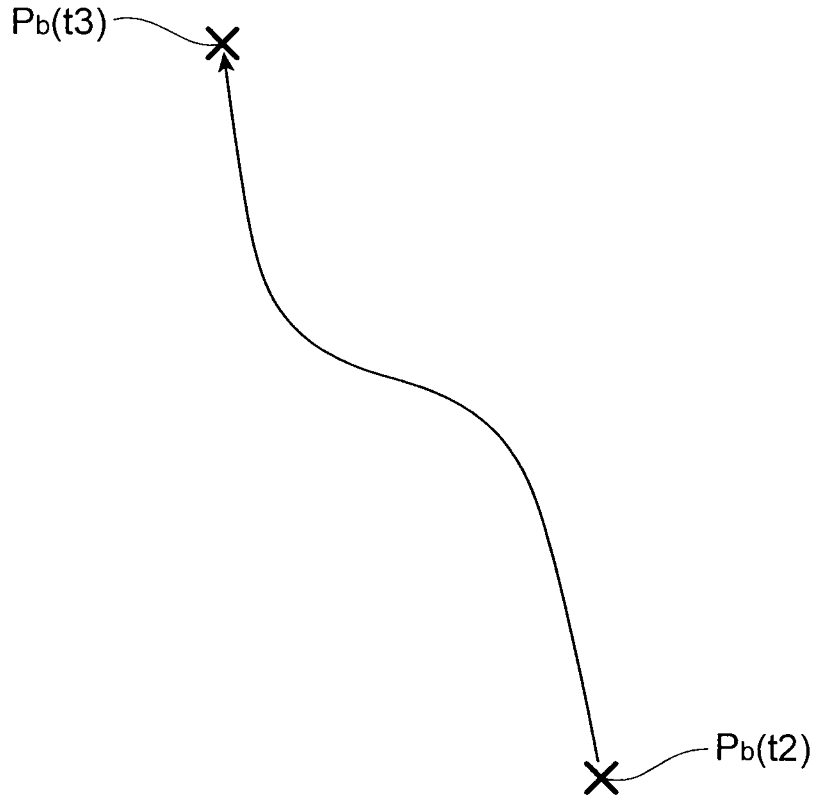
FIG. 9 is a plan view showing the traveling trajectory of a preceding vehicle from time t2 to time t3.
Figure 10:
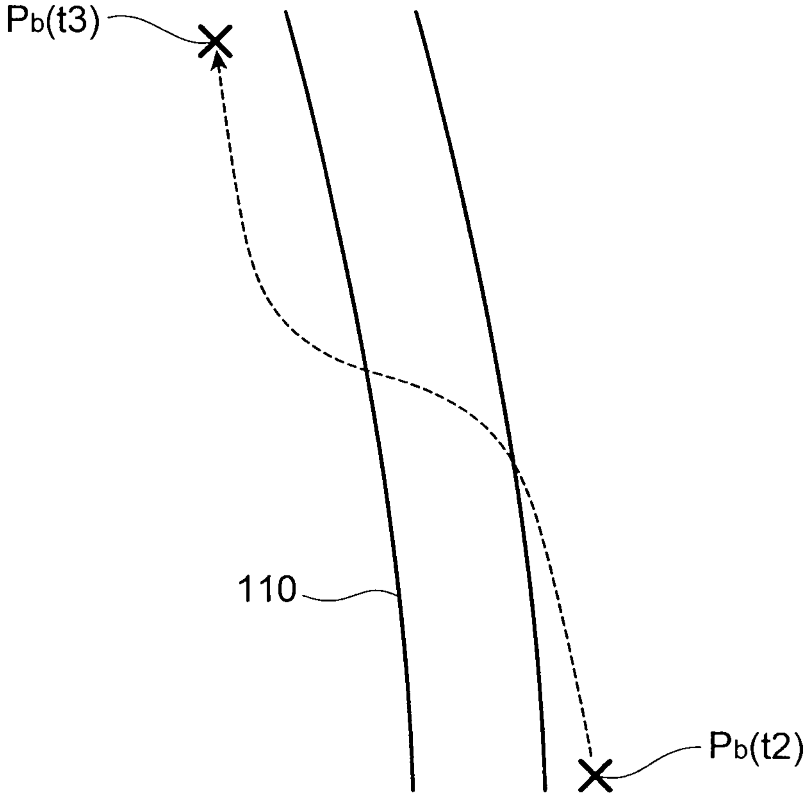
FIG. 10 is a plan view showing the lane shape extracted on the basis of the traveling trajectory and the like in FIG. 9.

As shown in FIG. 8, after time t2, the host vehicle traveling trajectory measuring section 223 of the vehicle B calculates the traveling trajectory (FIG. 9) of the host vehicle B from time t2 to an arbitrary time t3. In addition, the lane change counting section 229 of the vehicle B acquires the number of times of lane change from time t2 to time t3. The vehicle A receives the traveling trajectory information and the information regarding the number of times of lane change of the vehicle B from the vehicle B through vehicle-to-vehicle communication (S201). The lane judging section 25 of the vehicle A extracts a lane shape 110 on the basis of the trajectory shape, which is indicated by the received traveling trajectory information of the vehicle B, and the received information regarding the number of times of lane change, as shown in FIG. 10 (S203). That is, for example, if the number of times of lane change of the vehicle B is 0, the lane shape 110 becomes equal to the shape of the traveling trajectory of the vehicle B. In addition, the vehicle A can also extract the lane shape 110 on the basis of the traveling trajectory information and the information regarding the number of times of lane change of the host vehicle A.

Figure 11:
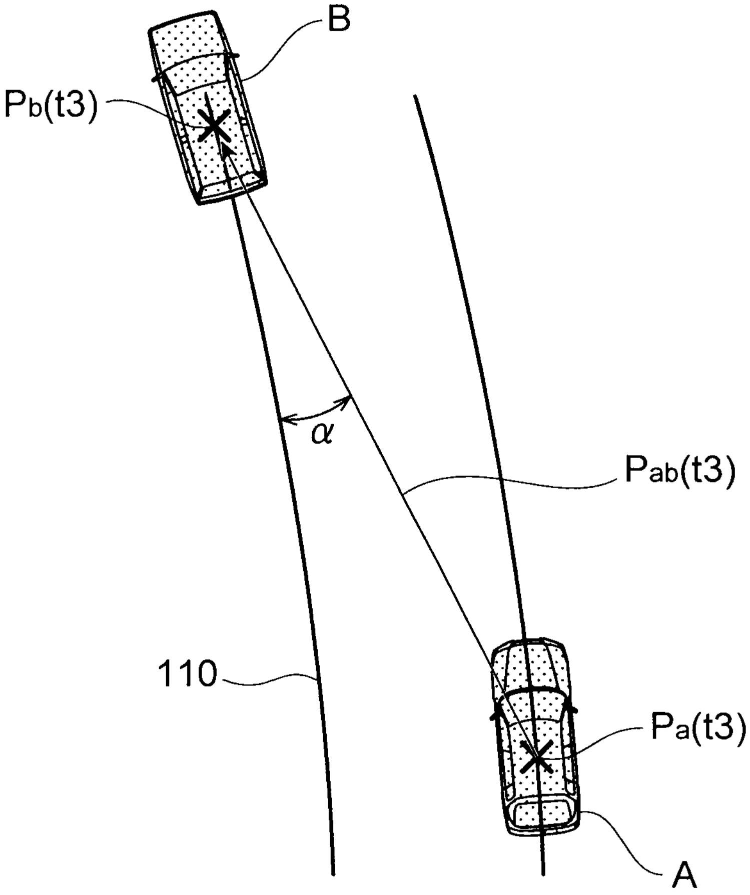
FIG. 11 is a plan view showing the positional relationship between a host vehicle and a preceding vehicle at time t3.

Then, at time t3, as shown in FIG. 11, the relative position measuring section 21 of the vehicle A calculates a relative position $P_{ab}$(t3) by the vehicle-to-vehicle code differential positioning method (S205). Then, the lane judging section 25 calculates an angle $\alpha$ formed by the vector $P_{ab}$(t3) and the extending direction of a lane based on the extracted lane shape 110 (S207). Here, it is thought that the angle $\alpha$ becomes close to 0 assuming that the vehicles A and B are traveling in the same lane at time t3 and the angle $\alpha$ becomes large to some extent assuming that the vehicles A and B are traveling in different lanes at time t3. Accordingly, if the angle $\alpha$ exceeds a predetermined threshold value Z (Yes in S209), the lane judging section 25 judges that the vehicles A and B are traveling in different lanes at time t3 (S211). If the angle $\alpha$ does not exceed the predetermined threshold value Z (No in S209), the lane judging section 25 judges that the vehicles A and B are traveling in the same lane at time t3 (S213). By determining whether or not there is a contradiction between this judgment result and the judgment result in the above-described processing S115, the judgment result can be rechecked. As a result, a more reliable judgment result can be acquired.

Figure 12:
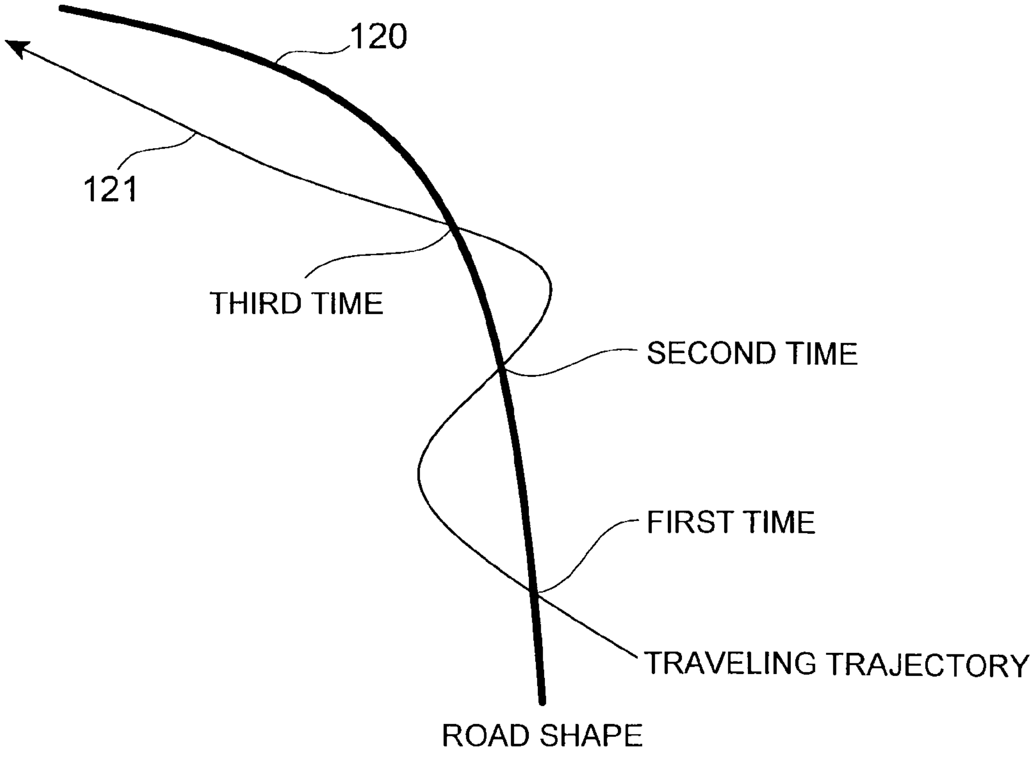
FIG. 12 is a plan view showing an example of a method of deriving the number of times of lane change from the road shape and the traveling trajectory.

The present invention is not limited to the embodiments described above. For example, the lane change counting section 229 of the vehicle B counts the number of times of lane change using centerline detection of the camera unit 217. However, instead of this, it is also possible to adopt the following method of counting the number of times of lane change. That is, as shown in FIG. 12, the lane change counting section 229 reads a road shape 120 (for example, shape of the centerline) of the current driving road from the map information stored in advance in the vehicle B. In addition, the lane change counting section 229 can derive the number of times of lane change by counting the number of intersections of the traveling trajectory 121 and the road shape 120 in a state where the traveling trajectory 121 acquired by the host vehicle traveling trajectory measuring section 223 overlaps the road shape 120. In the case of the example of FIG. 12, the number of times of lane change is calculated as 3 times. In addition, instead of acquiring the road shape 120 from the map information, the road shape 120 may be extracted on the basis of the trajectory shape indicated by the traveling trajectory information of the vehicle B and the received information regarding the number of times of lane change by imitating the above-described processing of S201 and S203 in FIG. 8.

Figure 13:
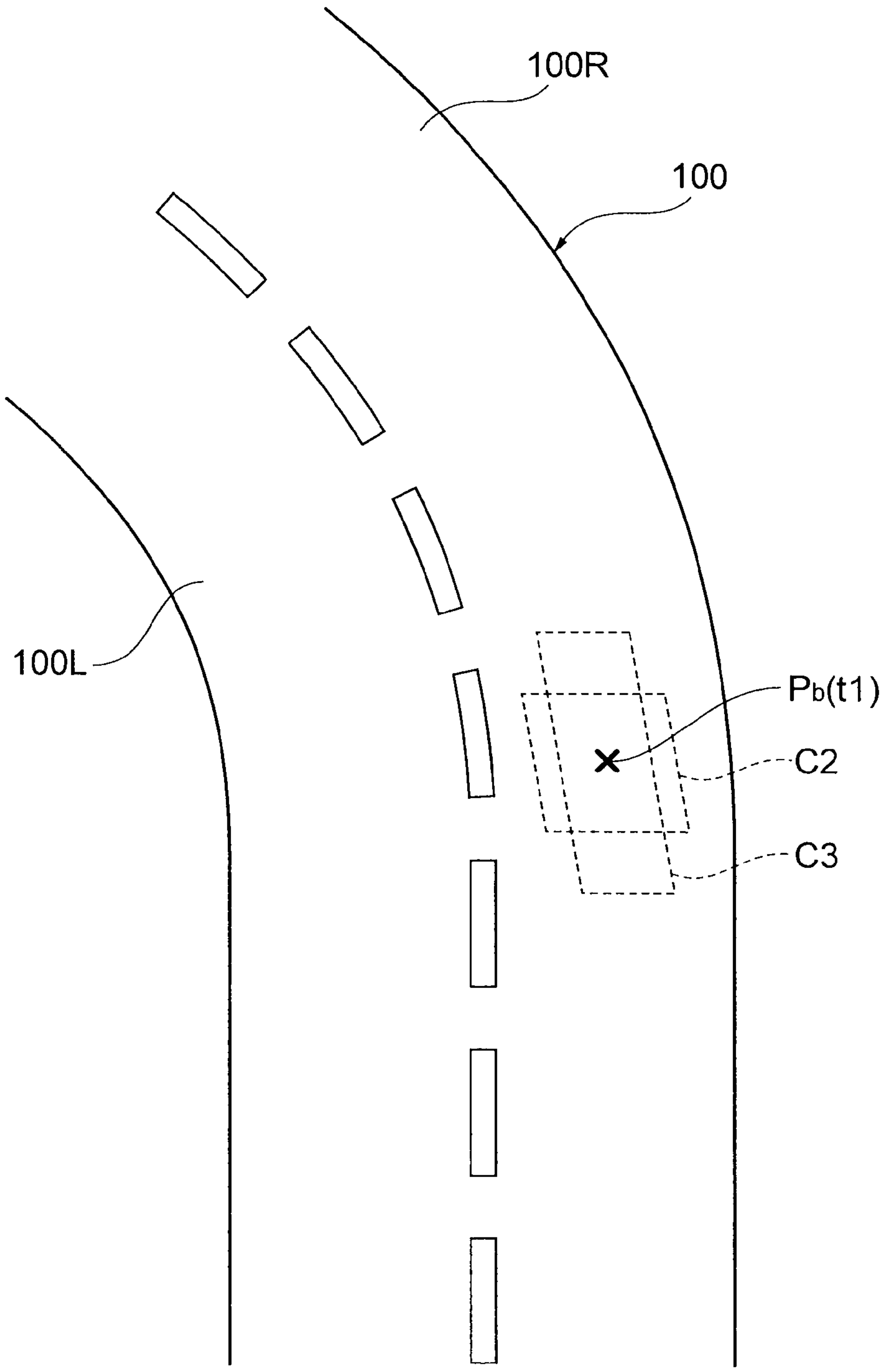
FIG. 13 is a plan view showing another example of the same lane judgment region.

In addition, although the radius r of the same lane judgment region C (FIG. 5) is set to 1 m, the size of the radius r may be appropriately set so that it is possible to determine whether or not the vehicle A has passed the same lane as the position $P_b$(t1) in consideration of the lane width on the road 100. In addition, the same lane judgment region C is not limited to the circular shape. For example, as shown in FIG. 13, a rectangular same lane judgment region C2 which surrounds the position $P_b$(t1) may also be set. In addition, the same lane judgment region C2 may be a rectangle extending in the extending direction of a lane, and the length or the width of the rectangle in the extending direction of the lane may be appropriately changed according to the road shape or the speed of the vehicles A and B. For example, the length of the same lane judgment region C2 in the extending direction of the lane may be set to increase as the speed of the vehicles A and B increases. Moreover, for example, when the road 100 is a highway, it is possible to set a same lane judgment region C3 which is longer in the extending direction of the lane than in the case of a city road. Thus, also when the speed of the vehicle A is high, it is possible to reliably detect that the vehicle A has passed through the same lane judgment region by making the same lane judgment region long. The reliability in judgment can be improved by adjusting the shape or the width of the same lane judgment region as described above.

In addition, although only the information of plane coordinates of the three-dimensional coordinates acquired by the GPS unit 11 and the GPS unit 211 is used in the relative position measuring section 21, it is also possible to use the three-dimensional relative position $P_{ab}$(t) between the vehicle A and the vehicle B. In this case, it may be used to judge the traveling position of the vehicle B, which travels along the road under the elevated road, from the vehicle A which travels on the elevated road, for example. In addition, the lane change counting section 229 may separately count the number of times of lane change to the right of the vehicle B and the number of times of lane change to the left. In this case, applications may also be made when the vehicles A and B travel along the road having three or more lanes.

INDUSTRIAL APPLICABILITY

The present invention relates to the vehicle traveling position judging method and the vehicle traveling position judgment device for judging the traveling position of a preceding vehicle, and makes it possible to judge the lane in which a preceding vehicle travels with high precision.

REFERENCE SIGNS LIST

1, 201: vehicle traveling position judgment device
11, 211: GPS unit
21: relative position measuring section (relative position information acquisition means)
23: host vehicle traveling trajectory measuring section (host vehicle traveling trajectory information acquisition means)
25: lane judging section (preceding vehicle position judgment means)
223: host vehicle traveling trajectory measuring section (preceding vehicle traveling trajectory information acquisition means)
229: lane change counting section (lane change information acquisition means)
A: vehicle (host vehicle)
B: vehicle (preceding vehicle)

The invention claimed is:

1. A vehicle traveling position judging method for judging a traveling position of a preceding vehicle, comprising:

a relative position information acquisition step of acquiring relative position information of the preceding vehicle and a host vehicle at a predetermined point in time;

a host vehicle traveling trajectory information acquisition step of acquiring traveling trajectory information of the host vehicle after the predetermined point in time; and a preceding vehicle position judging step of judging a traveling position of the preceding vehicle on the basis of the relative position information and the traveling trajectory information of the host vehicle, wherein in the relative position information acquisition step, the relative position information is calculated on the basis of a difference between coordinate information of the preceding vehicle acquired by a GPS and coordinate information of the host vehicle acquired by a GPS, a lane change information acquisition step of acquiring lane change information regarding lane changes of the preceding vehicle after the predetermined point in time is further included, in the host vehicle traveling trajectory information acquisition step, host vehicle passage information indicating that a traveling trajectory of the host vehicle after the predetermined point in time has passed a same lane judgment region, which is virtually set at the position of the preceding vehicle at the predetermined point in time, or a judgment end line, which is virtually set ahead of the same lane judgment region, is further acquired, in the preceding vehicle position judging step, the traveling position of the preceding vehicle is judged on the basis of the lane change information and the host vehicle passage information, and in the preceding vehicle position judging step, it is judged that the preceding vehicle at the predetermined point in time is in the same lane as the host vehicle after the predetermined point in time, when the host vehicle has passed through the same lane judgment region, and that the preceding vehicle at the predetermined point in time is in a different lane than the host vehicle after the predetermined point in time, when the host vehicle passes through the judgment end line without passing through the same lane judgment region.

2. A vehicle traveling position judging method for judging a traveling position of a preceding vehicle, comprising:

a relative position information acquisition step of acquiring relative position information of the preceding vehicle and a host vehicle at a predetermined point in time;

a host vehicle traveling trajectory information acquisition step of acquiring traveling trajectory information of the host vehicle after the predetermined point in time; and a preceding vehicle position judging step of judging a traveling position of the preceding vehicle on the basis of the relative position information and the traveling trajectory information of the host vehicle, wherein in the relative position information acquisition step, the relative position information is calculated on the basis of a difference between coordinate information of the preceding vehicle acquired by a GPS and coordinate information of the host vehicle acquired by a GPS, a lane change information acquisition step of acquiring lane change information regarding lane changes of the preceding vehicle after the predetermined point in time is further included, in the preceding vehicle position judging step, the traveling position of the preceding vehicle is judged on the basis of the lane change information, a preceding vehicle traveling trajectory information acquisition step of acquiring traveling trajectory information of the preceding vehicle after the predetermined point in time and a lane shape acquisition step of acquiring a lane shape of a lane, in which the preceding vehicle travels, on the basis of the traveling trajectory information of the preceding vehicle and the lane change information are further included, and in the preceding vehicle position judging step, the traveling position of the preceding vehicle is judged on the basis of the lane shape.

3. A vehicle traveling position judging method for judging a traveling position of a preceding vehicle, comprising:

a relative position information acquisition step of calculating relative position information of the preceding vehicle and a host vehicle at a predetermined point in time on the basis of coordinate information of the preceding vehicle acquired by a GPS and coordinate information of the host vehicle acquired by a GPS;

a host vehicle traveling trajectory information acquisition step of acquiring traveling trajectory information of the host vehicle after the predetermined point in time; and a preceding vehicle position judging step of judging a traveling position of the preceding vehicle on the basis of the relative position information and the traveling trajectory information of the host vehicle, wherein a lane change information acquisition step of acquiring lane change information regarding lane changes of the preceding vehicle after the predetermined point in time is further included, in the host vehicle traveling trajectory information acquisition step, host vehicle passage information indicating that a traveling trajectory of the host vehicle after the predetermined point in time has passed a same lane judgment region, which is virtually set at the position of the preceding vehicle at the predetermined point in time, or a judgment end line, which is virtually set ahead of the same lane judgment region, is further acquired, in the preceding vehicle position judging step, the traveling position of the preceding vehicle is judged on the basis of the lane change information and the host vehicle passage information, and in the preceding vehicle position judging step, it is judged that the preceding vehicle at the predetermined point in time is in the same lane as the host vehicle after the predetermined point in time, when the host vehicle has passed through the same lane judgment region, and that the preceding vehicle at the predetermined point in time is in a different lane than the host vehicle after the predetermined point in time, when the host vehicle passes through the judgment end line without passing through the same lane judgment region.

4. A vehicle traveling position judgment device for judging a traveling position of a preceding vehicle, comprising:

relative position information acquisition means for acquiring relative position information of the preceding vehicle and the host vehicle at a predetermined point in time;

host vehicle traveling trajectory information acquisition means for acquiring traveling trajectory information of the host vehicle after the predetermined point in time; and preceding vehicle position judging means for judging a traveling position of the preceding vehicle on the basis of the relative position information and the traveling trajectory information of the host vehicle, wherein the relative position information acquisition means calculates the relative position information on the basis of a difference between coordinate information of the preceding vehicle acquired by a GPS and coordinate information of the host vehicle acquired by a GPS, lane change information acquisition means for acquiring lane change information regarding lane changes of the preceding vehicle after the predetermined point in time is further included, the host vehicle traveling trajectory information acquisition means further acquires host vehicle passage information indicating that a traveling trajectory of the host vehicle after the predetermined point in time has passed a same lane judgment region, which is virtually set at the position of the preceding vehicle at the predetermined point in time, or a judgment end line, which is virtually set ahead of the same lane judgment region, the preceding vehicle position judging means judges the traveling position of the preceding vehicle on the basis of the lane change information and the host vehicle passage information, and the preceding vehicle position judging means judges that the preceding vehicle at the predetermined point in time is in the same lane as the host vehicle after the predetermined point in time, when the host vehicle has passed through the same lane judgment region, and that the preceding vehicle at the predetermined point in time is in a different lane than the host vehicle after the predetermined point in time, when the host vehicle passes through the judgment end line without passing through the same lane judgment region.

5. A vehicle traveling position judgment device for judging a traveling position of a preceding vehicle, comprising:

relative position information acquisition means for acquiring relative position information of the preceding vehicle and the host vehicle at a predetermined point in time;

host vehicle traveling trajectory information acquisition means for acquiring traveling trajectory information of the host vehicle after the predetermined point in time; and preceding vehicle position judging means for judging a traveling position of the preceding vehicle on the basis of the relative position information and the traveling trajectory information of the host vehicle, wherein the relative position information acquisition means calculates the relative position information on the basis of a difference between coordinate information of the preceding vehicle acquired by a GPS and coordinate information of the host vehicle acquired by a GPS, lane change information acquisition means for acquiring lane change information regarding lane changes of the preceding vehicle after the predetermined point in time is further included, the preceding vehicle position judging means judges the traveling position of the preceding vehicle on the basis of the lane change information, preceding vehicle traveling trajectory information acquisition means for acquiring traveling trajectory information of the preceding vehicle after the predetermined point in time and lane shape acquisition means for acquiring a lane shape of a lane, in which the preceding vehicle travels, on the basis of the traveling trajectory information of the preceding vehicle and the lane change information are included, and the preceding vehicle position judging means judges the traveling position of the preceding vehicle on the basis of the lane shape.

6. A vehicle traveling position judgment device for judging a traveling position of a preceding vehicle, comprising:

relative position information acquisition means for calculating relative position information of the preceding vehicle and a host vehicle at a predetermined point in time on the basis of coordinate information of the preceding vehicle acquired by a GPS and coordinate information of the host vehicle acquired by a GPS;

host vehicle traveling trajectory information acquisition means for acquiring traveling trajectory information of the host vehicle after the predetermined point in time; and preceding vehicle position judging means for judging a traveling position of the preceding vehicle on the basis of the relative position information and the traveling trajectory information of the host vehicle, wherein lane change information acquisition means for acquiring lane change information regarding lane change of the preceding vehicle after the predetermined point in time is further included, the host vehicle traveling trajectory information acquisition means further acquires host vehicle passage information indicating that a traveling trajectory of the host vehicle after the predetermined point in time has passed a same lane judgment region, which is virtually set at the position of the preceding vehicle at the predetermined point in time, or a judgment end line, which is virtually set ahead of the same lane judgment region, the preceding vehicle position judging means judges the traveling position of the preceding vehicle on the basis of the lane change information and the host vehicle passage information, and the preceding vehicle position judging means judges that the preceding vehicle at the predetermined point in time is in the same lane as the host vehicle after the predetermined point in time, when the host vehicle has passed through the same lane judgment region, and that the preceding vehicle at the predetermined point in time is in a different lane than the host vehicle after the predetermined point in time, when the host vehicle passes through the judgment end line without passing through the same lane judgment region.

* * * * *